Feb. 11, 1941.  D'ARCY A. YOUNG, JR., ET AL  2,231,743
ROLL FILM HOLDER FOR PROJECTORS
Filed Feb. 11, 1939  2 Sheets-Sheet 1

D'Arcy A. Young Jr.
Paul C. Stetson
INVENTORS

BY
ATTORNEYS

Feb. 11, 1941.  D'ARCY A. YOUNG, JR., ET AL  2,231,743
ROLL FILM HOLDER FOR PROJECTORS
Filed Feb. 11, 1939   2 Sheets-Sheet 2
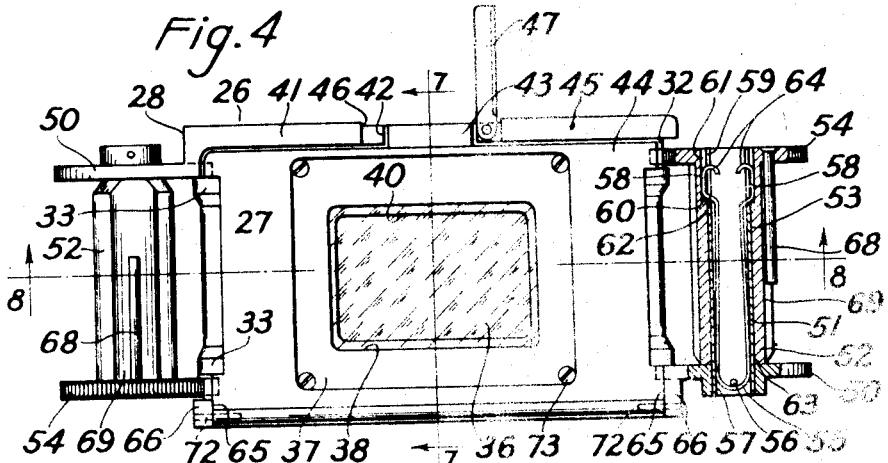
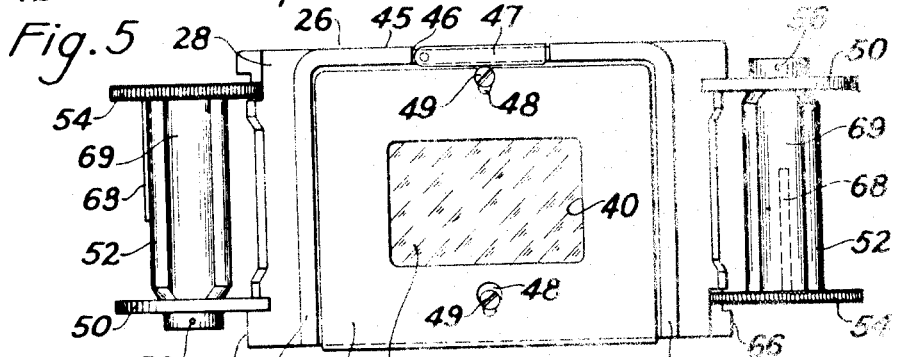
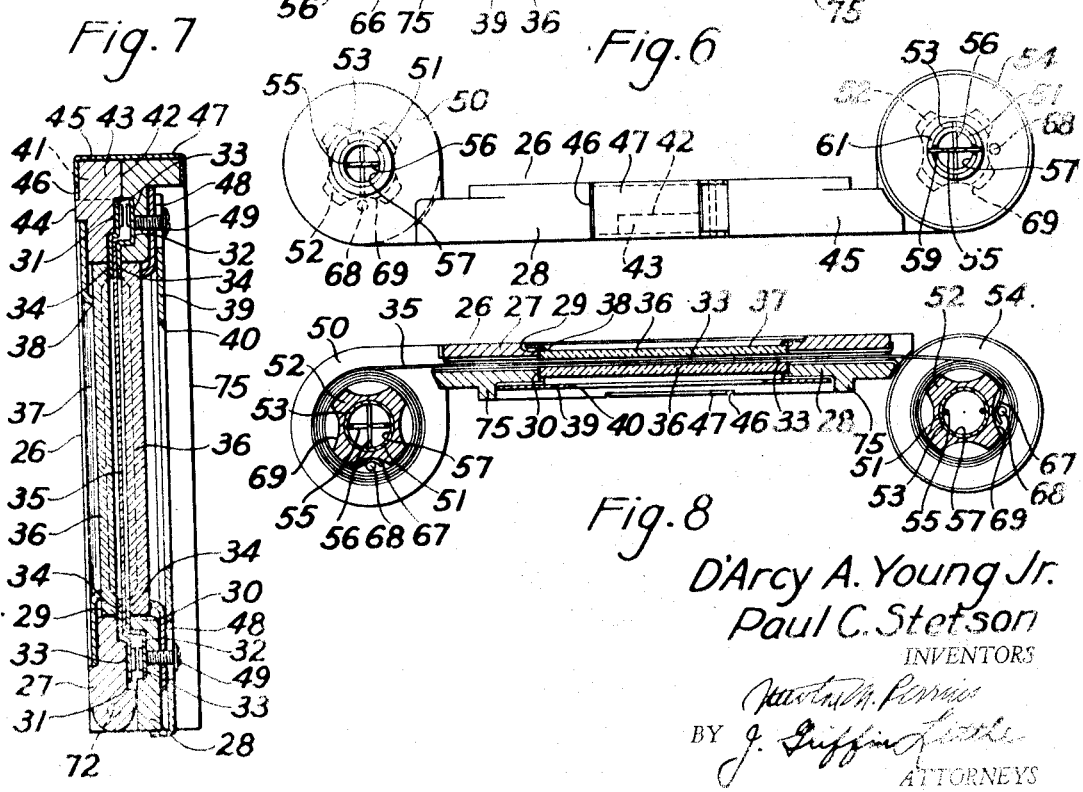
D'Arcy A. Young Jr.
Paul C. Stetson
INVENTORS
BY
ATTORNEYS Patented Feb. 11, 1941

2,231,743

UNITED STATES PATENT OFFICE 2,231,743

ROLL FILM HOLDER FOR PROJECTORS

D'Arcy A. Young, Jr., and Paul C. Stetson, Rochester, N. Y., assignors to Eastman Kodak Company, Rochester, N. Y., a corporation of New Jersey Application February 11, 1939, Serial No. 255,909

11 Claims. (Cl. 88—28)

The present invention relates to a film projecting apparatus, and more particularly to a projector intended for use with miniature films.

One object of the invention is the provision of a roll film gate member which is detachably mounted in position in the projector so that the projector may be selectively used either with individual lantern slides or roll film.

Another object of the invention is the provision of a projector in which the objective lens barrel and the film gate may be rotated, as a unit, about the optical axis so that differently arranged image areas may always be projected in the upright position.

A further object of the invention is the provision of a slotted lens barrel arranged to receive the film gate and provided with a releasable catch to detachably secure the film gate in position in the lens barrel and in alignment with the optical axis thereof.

A still further object of the invention is the provision of a novel film gate and film spool construction which may be detachably secured as a unit to a film projector.

To these and other ends, the invention resides in certain improvements and combinations of parts all as will be hereinafter more fully described, the novel features being pointed out in the claims at the end of the specification.

In the drawings:

Fig. 4 is a front view, with parts in section and parts in elevation, of a film gate constructed in accordance with the preferred embodiment of the invention:

Fig. 5 is a back view of the film gate illustrated in Fig. 4:

Fig. 6 is a top view of the film gate shown in Figs. 4 and 5:

Fig. 7 is a vertical sectional view through the film gate, taken substantially on the line 7—7 of Fig. 4 but on a slightly larger scale than the latter, showing the relation of the various gate parts; and Fig. 8 is a horizontal sectional view through the film gate, taken substantially on the line 8—8 of Fig. 4, showing the relation of the film gate and the film supply and takeup spools.

Similar reference numerals throughout the various views indicate the same parts.

Figure 1:
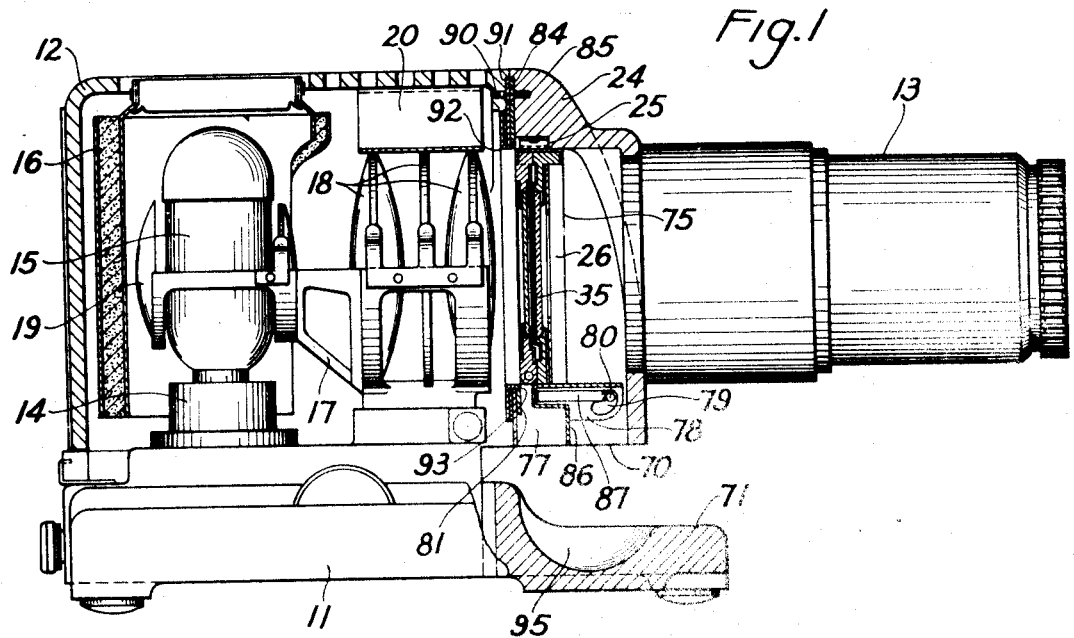
Fig. 1 is a side view of a picture projector with parts in section and parts in elevation, showing the relation of the various parts of the projector and a removable roll film gate constructed in accordance with the present invention.

The drawings show a projector which comprises, in general, a base 11, a lamphouse 12 positioned on the base, and a forwardly projecting lens barrel 13 in which the objective lenses, not shown, are mounted. The base has secured thereto a lamp socket 14 in which is positioned a projection lamp 15 which is surrounded on three sides by a suitable insulating shield 16. A bracket 17, secured to the base, carries the condensing lenses 18 and a reflector 19, the lenses 18 being held in position by a U-shaped spring 20 secured to the lamphouse and engaging the lenses, all as shown in Fig. 1.

The objective lens barrel or tube 13 is formed with an enlarged portion 24, of the shape best shown in Fig. 1, which is provided with a transversely extending slot 25 adapted to receive a roll film gate, broadly designated by the numeral 26 and hereinafter more fully described. This film gate is adapted to successively position and frame image areas of a film strip so that such areas may be projected by the objective lens positioned in the tube 13. This film gate is also detachably secured to the plate in the projector, in a manner to be later described, so that the projector may be selectively used to project either individual lantern slides, or image areas arranged on a film strip.

In the preferred form the film gate comprises a pair of flat plates 27 and 28, see Fig. 8, formed with registering apertures 29 and 30 respectively. The plate 27 is provided with marginal ridges 31, see Fig. 7, formed along the opposite edges thereof and arranged to extend into registering slots or grooves 32 formed on the plate 28, when the gate is in closed position, as shown in Fig. 7. These ridges and slots have secured thereto, in any suitable well-known manner, thin Z-shaped metal strips 33, the portions 34 of which overlie the main portions of the plates 27 and 28 to provide marginal guides or tracks which engage the edges only of the film strip 35, as shown in Fig. 7, to guide the latter during its passage through the gate. The portions 34 of strips 33 extends slightly beyond the edges of the apertures 29 and 30 to provide supports for the glass strips 36 positioned in the apertures, as shown in Fig. 7.

Each of these glass strips is detachably yet securely retained in place by a plate 37, the aperture 38 of which is of such size as to frame an image area of the film strip 35. Screws 73, or other suitable fastening means, may be provided for detachably securing the plate 37 in position. The aperture 38 of the plate 37 is of such size as to accommodate the largest miniature image area for which the machine is designed. However, in order to adapt the gate to film strips having image areas of different sizes and dimensions, additional detachable aperture plates 39 are preferably provided, only one of which is shown in Fig. 5. The aperture 40 of the plate 39 is of such size and shape as to frame a particular image area of the film strip positioned in the film gate. These additional aperture plates are provided with slots 48, see Fig. 5, through which screws 49 extend to detachably secure the plates 39 to the gate plate 28. By means of these auxiliary aperture plates, miniature film strips having different size image areas may be interchangeably positioned in the film gate.

The plate 28 of the film gate is slightly wider than the plate 27, see Fig. 7, and has one edge thereof formed with an upstanding marginal ridge or flange 41 having a slot or recess 42, Fig. 4, adapted to receive a laterally extending lug 43 formed on one of the ridges 31, of the plate 27. The flange 41 is of a height substantially equal to the thickness of the plate 27 so that the front or top face 44 thereof lies in the plane of the top 45 of the flange 41 when the gate is in closed position, as best shown in Fig. 7. A shoulder or countersunk portion 46 is formed on the edges of the slot 42 to receive a U-shaped clasp 47 pivoted on the plate 28. This clasp serves to retain or hold the lug 43 in the slot 42 to maintain the gate in closed or film clamping position, as is apparent from Figs. 5 and 7.

In order to permit cleaning of the inner faces of the glass strip 36 and to facilitate the initial threading of the film strip 35 through the gate, the plates 27 and 28 are preferably hingedly connected together along their lower edges, as viewed in Figs. 4 and 5, so that the plates may be swung apart for such cleaning or threading. To this end, the opposite edges 65 of the plate 28 are provided with end lugs 66 in which are mounted hinge pintels 72 which extend into the adjacent portions of the plate 27, as clearly shown in Fig. 4. By means of this arrangement, the plates are hingedly connected together along one edge and may be easily separated when the clasp 47 is moved to the position shown in Fig. 4. Obviously, before the plates can be thus separated, the gate member must be first removed from the projector, in a manner to be later described.

A pair of outwardly extending hubs or flanges 50 are formed on opposite ends of the plate 28, each flange having secured thereto, or formed integral therewith, a tubular film-spool supporting spindle 51, only one of which is shown in detail in Fig. 4. Each film spool comprises in the present embodiment, a core or hub 52 formed with a longitudinally extending opening or bore 53 in which the spindle 51 may be positioned to rotatably mount the spool thereon. One end of the core 52 is formed to provide a radially extending flange 54 which cooperates with the hub 50 to provide end flanges for the film spool. These end flanges serve to engage the marginal edges of the film strip as the latter is wound onto the core 52 to maintain the various film convolutions in alignment, as is apparent.

In order to properly position and detachably secure each film spool on its spindle, each of the latter is provided with a U-shaped spring 55 which is anchored by a pin 56 within the tubular spindle 51, as clearly shown in Fig. 4. This spring extends along the inner wall 57 of the spindle, and is formed with bent ends 58 which project radially through slots 59 formed in the wall 57, see Fig. 4. These bent ends 58 engage a shoulder 60 formed at the base of a countersunk portion 61 of the bore 53 to releasably position and secure the spool on the spindle.

When the spool is to be removed, the flange 54 is grasped and the flange and its core 52 are moved upwardly, as viewed in Fig. 4. This movement brings the shoulder 60 into engagement with inclined portions 62 of the spring ends 58 to cam or press the latter together to release the core. The spool may now be slid off the spindle, the spring ends 58 sliding along the walls of the bore 53. In placing a spool on the spindle 51, an inclined cam surface 63 on the end of the core 52 engages the rounded free ends 64 of the portions 58 of the spring 55 to force or cam these portions into the slot 59. The spool is then slid into position until the countersunk portion 61 registers with the bent end portions 58 of the spring. At this time, the latter, due to their resiliency, move radially to engage the shoulder 60 of the countersunk portion 61 to releasably hold the spool on the spindle, as is apparent from an inspection of Fig. 4.

The film strip 35 is fed or moved through the gate by turning the flange 54 on the take-up spool to wind the film strip 35 onto the core 52 of the take-up spool. In order to facilitate such rotation, the periphery of the flange 54 is milled or otherwise roughened. Such movement of the film strip serves to bring the desired image area into projection position and in registry with the aperture 38 of the plate 37 or the aperture 40 of the auxiliary plate 39. The film feeding means is thus formed on and constitutes a part of the film spools themselves. As the film strip may be thread in either direction through the film gate, the designation of the supply and take-up spools are merely relative depending upon the direction of film movement through the gate. In order to secure the free end 67 of the film strip to the spool, the flange 54 has secured thereto a laterally extending pin 68 which overlies the core 52 and under which the free end 67 of the film strip may be inserted, as shown in Fig. 8. In order to enable the subsequent film convolutions to engage the face of the core 52 to form a smooth roll, the pin 58 is preferably positioned in a fluting or longitudinal recess 69 formed in the surface of the core, as best shown in Fig. 8. If desired, additional flutings 69 may be provided on the core 52, as shown in the drawings.

In order that the projector may be selectively used for either individual lantern slides or roll film, the above described film gate, with its film spools, is preferably removably positioned in the slot 25 of the portion 24. When the film gate 26 is thus removed, a lantern slide holder, not shown, may be inserted in position in the slot 25. By means of such an arrangement the projector is equally well adapted to be used with transparencies arranged either in the form of separate lantern slides or on a film strip.

Figure 2:
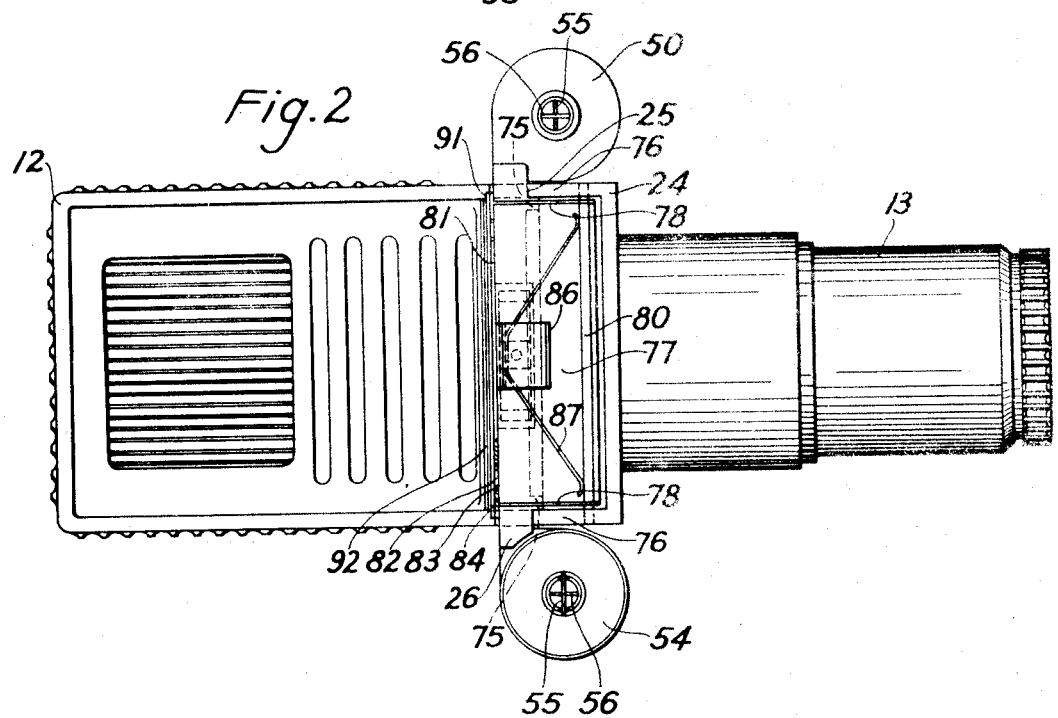
Fig. 2 is a plan view of the projector and film gate illustrated in Fig. 1, with the lens barrel rotated about its axis to permit ready insertion or removal of the film gate.

Upon an inspection of Fig. 2, it is apparent that due to the presence of the end hubs 50, the film gate 26 may not be inserted laterally into the slot 25 as in the case of the usual lantern slide holders. It is evident, however, that the thickness of the plates 27 and 28 is such as to fit in the slot 25. Obviously, therefore, the plates 27 and 28 may be inserted in the slot 25 from the top or bottom thereof. To this end, the bottom of the portion 24 is cut away, as shown at 70 Fig. 1, so that the slot 25 is opened at the bottom. Due to the presence of the projection 71 of the base 11, the gate 26 cannot be inserted in the slot 25 with the parts in the positions shown in Fig. 1. For this reason, the lens tube 13 and the portion 24 are rotatably mounted on the lamphouse 12, in a manner to be later described.

Now by rotating the lens tube 13 and the portion 24 about the axis of the tube, the cut away portion 70 may be moved to the top of the projector, as shown in Fig. 2. The plates 27 and 28 may now be readily slid downwardly into the slot 25. In order to accurately position the gate in the slot 25 so that the gate apertures will always be in alignment with the tube 13, the plate 28 is formed with ribs 75 adapted to engage spaced flanges 76 formed on the portion 24, as best shown in Fig. 2. Thus the insertion of the gate in the slot 25 automatically aligns the gate relative to the lens tube. The parts may be used in the position shown in Fig. 1, or the tube 13 may now be rotated to return the parts to the position shown in Fig. 1.

Figure 3:
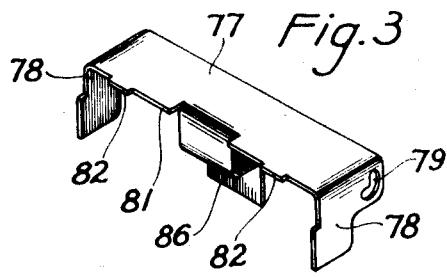
Fig. 3 is a perspective view of the pivoted and slidable plate for detachably retaining the film gate in position in the projector.

In order to retain the gate in the slot 25, means is preferably provided for closing the bottom of the latter. This retaining means comprises, in the present embodiment, a plate 77, see Fig. 3, formed with depending side walls 78 each of which has an arcuate slot 79 arranged to receive a pintle 80 mounted on the portion 24 by which the plate is both pivotally and slidably mounted thereon. This plate when positioned, as shown in Fig. 1, serves to close the bottom of the slot 25 and to also afford a support for the gate member. In order to retain the plate 77 in gate supporting and slot closing position, the front or free edge 81 thereof, see Fig. 3, is provided with a pair of lugs 82 arranged to extend into registering openings 83 formed in a plate 84 secured to the portion 24, by screws 85, as best shown in Fig. 1. The front edge 81 is also provided with an offset finger operating portion 86, of the shape best shown in Fig. 3. The V-shaped spring 87, see Fig. 2, has the ends thereof engaging the pintle 80 while the intermediate portion is secured to the finger operating portion 86. This spring tends to move the plate 77 to the left, as viewed in Fig. 2, to retain the lugs 82 in the openings 83 to thus maintain the plate 77 in the slot closing position.

As is well known, a film strip may contain both vertically and horizontally arranged image areas. In order that such areas may be projected in erected position, the film gate must obviously be rotated to the proper projecting position. Therefore, the tube 13 and portion 24 are rotatably mounted to also permit proper projection of the different arranged image areas. To secure this result, the front of the lamphouse 12 has secured thereto, by screws 90, a plate 91, as best shown in Fig. 1. A plate 92, L-shaped in cross section, engages the rear face of the plate 90 and extends across the edge of the latter to engage the plate 84 which lies adjacent the front face of the plate 90, all as clearly shown in Fig. 1. The end 93 of the plate 92 is secured to the inner edge of the plate 84 by being peened over, or by other suitable means.

Referring now to Fig. 1, it is apparent that the plates 84 and 92 are secured to the portion 24 and straddle the plate 91 which is secured to the lamphouse 12. Such an arrangement provides a rotatable supporting connection between the lamphouse and the lens barrel 13 so that the latter may be rotated on the lamphouse for the reasons above described. When, however, the gate 26 is arranged to project a vertically arranged image, one of the film spools will tend to strike the forward portion 71 of the base 11. To this end this portion is provided with a curved recess 95 to accommodate the vertically arranged film spool.

To remove the gate 26, the tube 13 is first turned to the position shown in Fig. 2. The finger operating portion 86 is then moved to the right to disengage the lugs 82 from the openings 83 in the plate 84. The plate 77 may now be removed by lifting the gate upwardly out of the slot 25. After the gate is removed, the slot may be closed by swinging the plate 77 to the horizontal position, shown in Fig. 1, so that the lugs 82 will be again positioned in the openings 83. The projector is now adapted to receive a lantern slide holder in which individual lantern slides may be positioned for projection.

It is apparent from the above description, that the present invention provides an arrangement by which the projector may be selectively used with either separate lantern slides or image areas arranged in the form of a film strip. It is also apparent that the film gate and the film spools therefore constitute a unitary structure which may be detachably secured to the projector. Furthermore the objective lens barrel and the film gate may be rotated as a unit to properly position both vertically and horizontally arranged film areas. The projector is provided with a simple yet effective catch which not only serves to position but to also support the film gate in the projector. This catch may be quickly and easily removed to its inoperative position to permit insertion or removal of the film gate.

While one embodiment of the invention has been disclosed, it is to be understood that the inventive idea may be carried out in a number of ways. This application is therefore not to be limited to the precise details described but is intended to cover all variations and modifications thereof falling within the spirit of the invention or the scope of the scope of the appended claims.

We claim:
1. In a film projecting apparatus, a film gate comprising a pair of flat apertured members between which a film strip is adapted to be moved, film guide means on said members, film supply and receiving spools, spool supporting spindles formed at opposite ends of one of said members, a fixed hub positioned at one end of each of said spindles, means on each of said spindles for yieldably engaging one of said spools to both position and lock the spool on its spindle, and means comprising a guide flange on one of said spools for rotating the latter for moving said strip between said members and into registry with the apertures thereof, said flange being spaced from said hub and cooperating therewith to form end flanges for said spool.

2. In a film projecting apparatus, a film gate comprising a pair of flat apertured members between which a film strip is adapted to be moved, film guide means on said members, stationary spool receiving spindles on the opposite ends of one of said members, film supply and receiving spools positioned on said spindles, an abutment formed on each of said spools, spring means on said stationary spindles arranged to engage said abutments to position and releasable secure the spools on said spindles, and film winding means integral with said spools and independent of said spring means and said spindle for rotating said spool to wind said strip thereon.

3. In a film projecting apparatus, a film gate comprising a pair of flat apertured members between which a film strip is adapted to be moved, film guide means on said members, a hub formed on one end of one of said members, a stationary spool receiving spindle on said hub, a film spool having an annular core rotatably mounted on said spindle, resilient means on said spindle, a counter-sunk shoulder formed in said core and adapted to be engaged by said resilient means to both position and releasably secure the latter on said spindle, means for rotating said spool to move said strip through said gate, and means on said spool cooperating with said hub for maintaining the film in alignment on said spool.

4. In a film projecting apparatus, a film gate comprising a pair of flat apertured members between which a film strip is adapted to be moved, film guide means on said members, a stationary hub formed on one end of one of said members, a tubular spool receiving spindle on said hub, a film spool, a hollow core on said spool rotatably mounted on said spindle, a spring member positioned within said spindle and having a portion thereof projecting radially therethrough to engage said core to position and releasably secure said core on said spindle, and a winding flange on one end of said core and spaced from said hub, said flange cooperating with said hub to form end flanges to align the film strip as the latter is wound onto said core.

5. In a film projecting apparatus, a film gate comprising a pair of flat apertured members between which a film strip is adapted to be moved, film guide means on said members, spool receiving spindles on the opposite ends of one of said members, a hub formed on one end of one of said members, a tubular spool receiving spindle on said hub, a film spool comprising a hollow core rotatably mounted on said spindle, an abutment formed on said core, a leaf spring secured in position in said spindle, said spring having the free end thereof projecting radially from said spindle to engage said abutment to position and releasably secure said spool on said spindle, a film winding flange on one end of said core and spaced from said hub but cooperating therewith to provide end flanges for said spool to maintain the film strip in alignment thereon, and an apertured plate detachably secured to one of said gate members to vary the size of the aperture therein.

6. In a film projecting apparatus, the combination with a lamphouse, of a lens barrel rotatably mounted on said lamphouse and formed with an open-end slot, a film gate adapted to be inserted into said slot to position said gate on said barrel, film winding means secured to opposite ends of said gate, and a spring pressed member separate from said gate and pivotally mounted on said barrel and arranged to be moved to one position to open said slot to permit said gate to be inserted therein or removed therefrom and to be moved to another position to close said slot to retain said gate therein.

7. In a film projecting apparatus, the combination with a lamphouse, of a slottted lens barrel extending forwardly from said lamphouse, interlocking members on said lamphouse and lens barrel for rotatably mounting the latter on said lamphouse, a film gate positioned in said slot, a slidably and pivotally mounted plate on said barrel arranged to be positioned to close said slot to removably secure said gate therein, and cooperating members on said barrel and said gate for positioning the latter in said slot.

8. In a film projecting apparatus, the combination with a lamphouse, of a slotted lens barrel extending forwardly from said lamphouse, interlocking members on said lamphouse and lens barrel for rotatably mounting the latter on said lamphouse, a film gate positioned in said slot, a spring pressed plate slidably and pivotally mounted on said barrel and arranged to close one side of said slot to retain said gate therein, means on said plate for moving the latter to a position to open said one side to permit removal of said gate, and shoulders on said gate arranged to engage portions on said barrel to position said gate relative thereto.

9. In a film projecting apparatus, the combination with a base, a lamphouse mounted on said base, an objective lens barrel projecting forwardly from said lamphouse, of interlocking members on said lamphouse and said barrel for mounting said barrel for rotation about its optical axis, said barrel being formed with a U-shaped slot extending normal to said axis, a film gate arranged to be inserted in said slot, shoulders on said gate adapted to engage complementary portions on said barrel to position said gate in said slot and in alignment with said axis, a pivotally mounted spring pressed plate for closing one side of said slot for releasably retaining said gate therein, and film spools secured to opposite ends of said gate, said base being formed with a recess adapted to receive one of said spools when said barrel is rotated to position said gate in one position.

10. In a film projecting apparatus, the combination with a base, a lamphouse mounted on said base, an objective lens barrel projecting forwardly from said lamphouse, of interlocking members on said lamphouse and said barrel for mounting said barrel for rotation about its optical axis, said barrel being formed with a U-shaped slot extending normal to said axis, a film gate arranged to be inserted in said slot, shoulders on said gate adapted to engage complementary portions on said barrel to position said gate in said slot and in alignment with said axis, a pivotally mounted spring pressed plate for closing one side of said slot for releasably retaining said gate therein, film spools secured to opposite ends of said gate, and means on said spools for moving a film strip through said gate, said base being formed with a recess in which one of said spools is positioned when said barrel is rotated to one position.

11. In a film projecting apparatus, the combination with a lamphouse, of a slotted lens barrel extending forwardly from said lamphouse, a film gate removably positioned in said slot, a member mounted on said barrel and arranged to close one side of said slot to support said gate and to removably secure the latter in the slot, means on said member adapted to engage said barrel to retain said member in slot-closing position, and cooperating means on said barrel and said gate for positioning the latter in said slot and in alignment with the optical axis of said barrel.

D'ARCY A. YOUNG, Jr.
PAUL C. STETSON.